United States Patent [19]

Geuvjehizian

[11] Patent Number: 5,036,683
[45] Date of Patent: Aug. 6, 1991

[54] STEERING WHEEL LOCK PROTECTOR

[76] Inventor: Moushegh Y. Geuvjehizian, 9831 Mercer Dr., Dallas, Tex. 75228

[21] Appl. No.: 532,878

[22] Filed: Jun. 4, 1990

[51] Int. Cl.⁵ ............................................. B60R 25/02
[52] U.S. Cl. ........................................ 70/18; 70/237; 70/360; 70/417; 292/302
[58] Field of Search ................. 70/360, 361, DIG. 20, 70/DIG. 27, 19, 417, 18, 237, 423, 424, 427, 428; 292/302

[56] References Cited

U.S. PATENT DOCUMENTS

| | | | |
|---|---|---|---|
| 1,378,757 | 5/1921 | Barwick | 70/18 |
| 3,071,958 | 1/1963 | Russo | 70/361 X |
| 3,401,543 | 9/1968 | Lewis | 70/237 |
| 3,916,658 | 11/1975 | Barry | 70/417 |
| 4,167,222 | 9/1979 | El Bindari | 70/237 X |
| 4,541,256 | 9/1985 | Green | 70/371 X |
| 4,726,207 | 2/1988 | Gifford | 70/237 X |

FOREIGN PATENT DOCUMENTS 40751  5/1932  France .................... 292/302

*Primary Examiner*—Lloyd A. Gall
*Attorney, Agent, or Firm*—Allan M. Shapiro

[57] ABSTRACT

The steering wheel lock protector has a two-piece housing which wraps around the ignition-steering wheel lock in the steering column of a modern automobile. The automobile lock is completely enclosed except that access is provided through a rotatable key-slotted disc to the ignition-steering wheel lock. The two-piece housing is engaged and disengaged from its steering wheel housing wraparound position by means of two axially aligned lock pins which are lock-actuated to engage in lock pin bosses.

15 Claims, 2 Drawing Sheets

STEERING WHEEL LOCK PROTECTOR

FIELD OF THE INVENTION

This invention is directed to a lock protector which engages around the steering column and ignition-steering wheel lock to protect the lock, but leaves access to the lock so that it may be actuated without removal of the lock protector.

BACKGROUND OF THE INVENTION

Modern automobiles have locks which accomplish two functions. When turned off, the engine ignition is disconnected so that the engine will not run. In addition, the steering is locked by locking the steering shaft within the steering column. Both functions are turned on and off by insertion and manipulation of a single key.

Regrettably, an attempt to steal the automobile may be centered upon the ignition-steering wheel lock. Thieves may screw a pull hammer into the key slot of the lock. Actuation of the pull hammer pulls out the lock barrel so that the ignition can be turned on and the steering post unlocked. These two factors, locking of the steering post and turning off of the ignition, can thus be overcome by a single effort on the part of a thief. Thus, protection of the lock becomes helpful in thief-proofing of the automobile.

Past efforts to protect the automobile ignition-steering wheel lock have principally comprised wraparound protective housings which totally enclose the lock. These housings are locked in place with their own keys, but must be removed when access to the ignition-steering wheel lock is required. Such constructions require the extra steps of installing and removing each time the car is parked and later used. This occasions considerable inconvenience and also requires storage of the housing when the car is in use. Thus, there is need for a more convenient and secure steering wheel lock protector for protecting the ignition-steering wheel lock and which does not require removal for utilization of the automobile.

SUMMARY OF THE INVENTION

In order to aid in the understanding of this invention, it can be stated in essentially summary form that it is directed to steering wheel lock protector which comprises a housing which wraps around the steering wheel lock. A key-slotted disc is rotatably mounted in the housing and is positioned over the ignition lock barrel, but with the key slot therein providing access to the key slot in the barrel. The housing of the steering wheel lock protector is openable, and when closed, at least one lock actuates two pins which engage through bosses on the lock protector to provide maximum security.

It is, thus, an object and advantage of this invention to provide a steering wheel lock protector which is strong so as to maximize automobile lock protection, which is easily installed so that it can be conveniently positioned by the user, and which may remain in place while the car is being used.

It is a further object and advantage of this invention to provide a steering wheel lock protector which is economic of construction so that it may be widely employed to provide resistance to auto theft.

It is another object and advantage of this invention to provide a steering wheel lock protector which is formed of two portions which wrap around the critical portion of the steering column and lock in position by means of plural lock pins axially aligned and extending across plural boss interfaces.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENT

Figure 1:
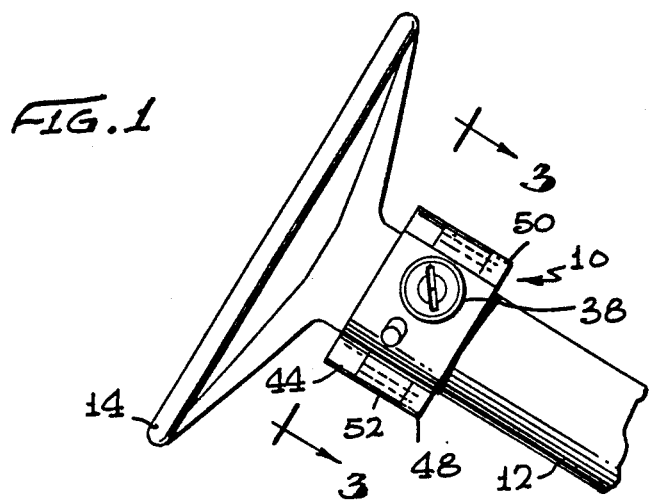
FIG. 1 is a side-elevational view of a steering wheel lock and its column, with the steering wheel lock protector of this invention shown installed thereon.
Figure 3:
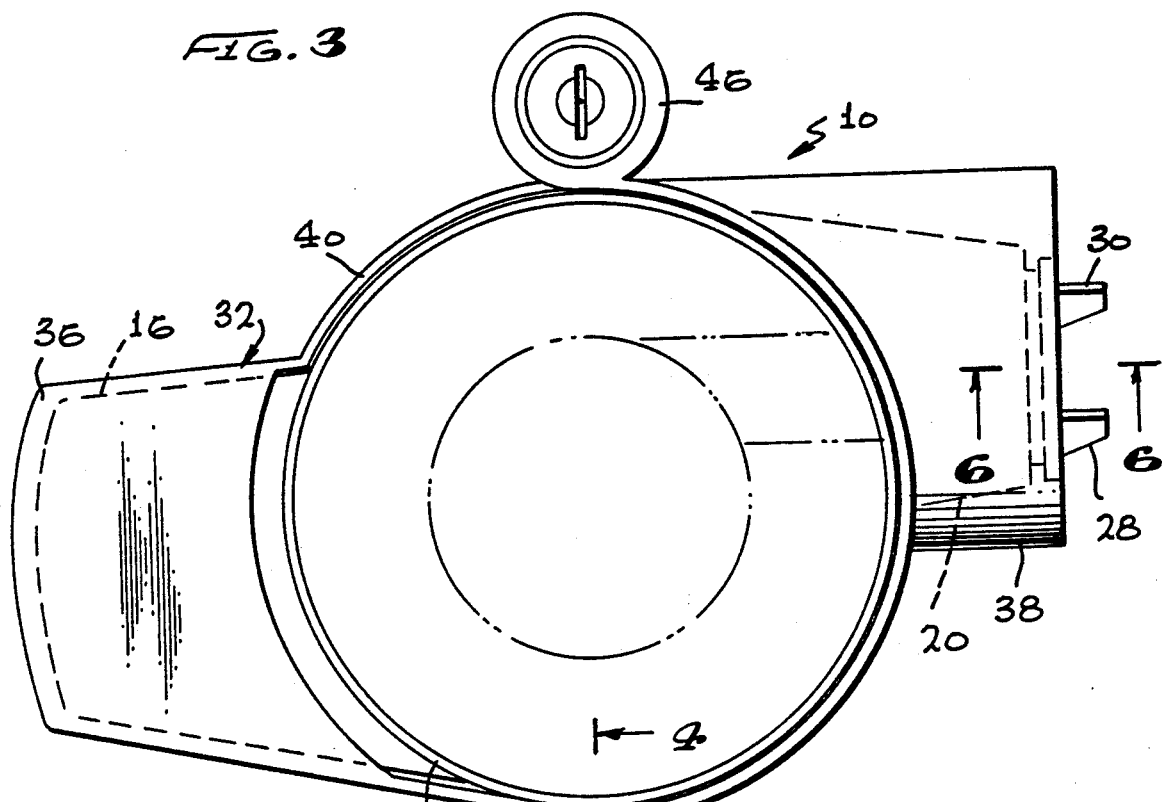
FIG. 3 is an enlarged plan view of the steering wheel lock protector, as seen generally along the line 3—3 of FIG. 1.

The steering wheel lock protector of this invention is generally indicated at 10 in FIGS. 1 and 3. The lock protector 10 has a housing which wraps around the steering column 12 of the automobile on which the lock protector is installed. Steering column 12 contains a steering shaft on which is mounted steering wheel 14. Within the column 12, there are various mechanisms which interact with the steering shaft. Such mechanisms are the turn signals. The four-way flasher switch, which is related to the turn signals, extends out of opening 18 in the steering column. Furthermore, the steering column may contain equipment which is not related to steering or locking of the vehicle. Such items may be high-beam control, windshield wiper control, cruise control, and/or horn. These controls are often manipulated by stalks which extend out from the protuberance 18 or other parts of the steering column. In some automobiles, the four-way flasher switch extends out of opening 18. These stalks must be accessible, and thus, must project out of openings in the lock protector 10.

Steering column 12 has a lock boss 20 thereon. The lock boss has a rotatable barrel therein. Tumblers interengage between the barrel and the boss 20. The tumblers are configured so that, when the proper key 22 is inserted in the key slot 24, the tumblers are positioned so that the barrel can rotate in the boss. The internal mechanism is such that, when the key and barrel are turned, they have at least two positions including a locked position and an operating position. In the locked position, the key can be withdrawn and the barrel 26 cannot be turned. In this position, a mechanical device locks the steering shaft. Furthermore, in this position, the ignition has an open circuit therein. When the key 22 is inserted and the barrel 26 is turned to the unlocked position, the steering column is released and the ignition circuit is completed so that the engine can be started and the car steered.

Ears 28 and 30 are formed on barrel 26 to aid in rotation of the barrel when the key is in place. A common way of disabling such ignition-steering wheel locks is to insert a pull hammer into key slot 24 and forcibly withdraw the barrel 26 from its boss 20. When withdrawn, the steering shaft lock can be disengaged and the ignition circuit completed. The steering wheel lock protector 10 of this invention engages around the steering column to protect the lock barrel 26, but still permits insertion of the key and turning of the lock barrel.

Lock protector 10 is configured to closely embrace around the steering column, including lock boss 20 and protuberance 16. The lock protector 10 is configured to a particular design, and it is anticipated that a different lock protector configuration would be required for each different steering column design. One size fits all is not a goal of this steering wheel lock protector. The steering wheel lock protector, in the preferred configuration illustrated, comprises two completely separable protector portions which are indicated at 32 and 34 in FIG. 2. The protector portions are completely separable as a convenience in installing the protection portions over the several stalks, protuberances and bosses on the steering column. To achieve a close fit, protector portion 32 has a housing 36 which engages over protuberance 16. Protector portion 34 has a tubular housing 38 which embraces lock boss 20. The protector portions have curved panels 40 and 42 which carry the housings 36 and 38. The curved panels closely embrace the steering column 12, as is best seen in FIG. 3. The housings engaging the projections on the steering column also prevent the lock protector 10 from sliding up and down on the column.

Figure 4:
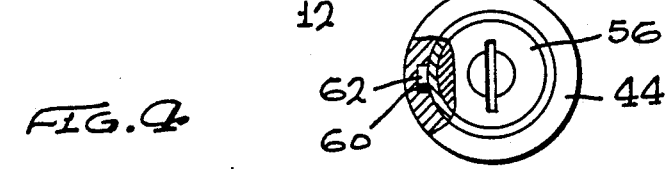
FIG. 4 is an enlarged section through the lock pins and bosses, as seen generally along line 4—4 of FIG. 3.

The protector portions are conveniently held together by a locking structure. The locking structure comprises lock bosses 44 and 46 and aligned pin-receiving bosses 48 and 50. In order to interengage with these bosses, pin bosses 52 and 54 are mounted on curved panel 42 of protector portion 34. When the two protector portions are engaged around the steering column, the bosses are fully engaged and aligned, as shown in FIGS. 3 and 4. The openings are coaxial. Key lock 56 has a cylindrical outer body surface and is slidably engaged in bore 58. Bore 58 has a slot 60 extending outwardly therefrom, from the bottom opening of the bore, partway to the top. Pin 62 slides in slot 60 and limits upward motion of the key lock 56 upward in the bore to the terminal position shown in FIG. 5. Plunger 64 is fixed to the body of lock 56 and extends downwardly out through the opening in bottom cover 66. The bottom cover is installed in an annular groove in the bottom of bore 58 to limit the downward motion of the key lock and its plunger. Compression spring 68 resiliently urges the lock 56 and its plunger 64 to the upper stop position shown in FIG. 5.

The key lock 56 is such that a latch 70 is spring-urged to extend out of the body of key lock 56 unless the key is turned. When the lock 56 is pressed down, the latch 70 engages in latch recess 72 to hold the key lock 56 in the depressed, locked position shown in FIG. 4. When the key is turned, latch 70 is retracted so that compression spring 68 can raise the lock 56 and its plunger 64 to the raised position in FIG. 5. In this position, the plunger 64 does not extend below bottom cover 66.

Figure 5:
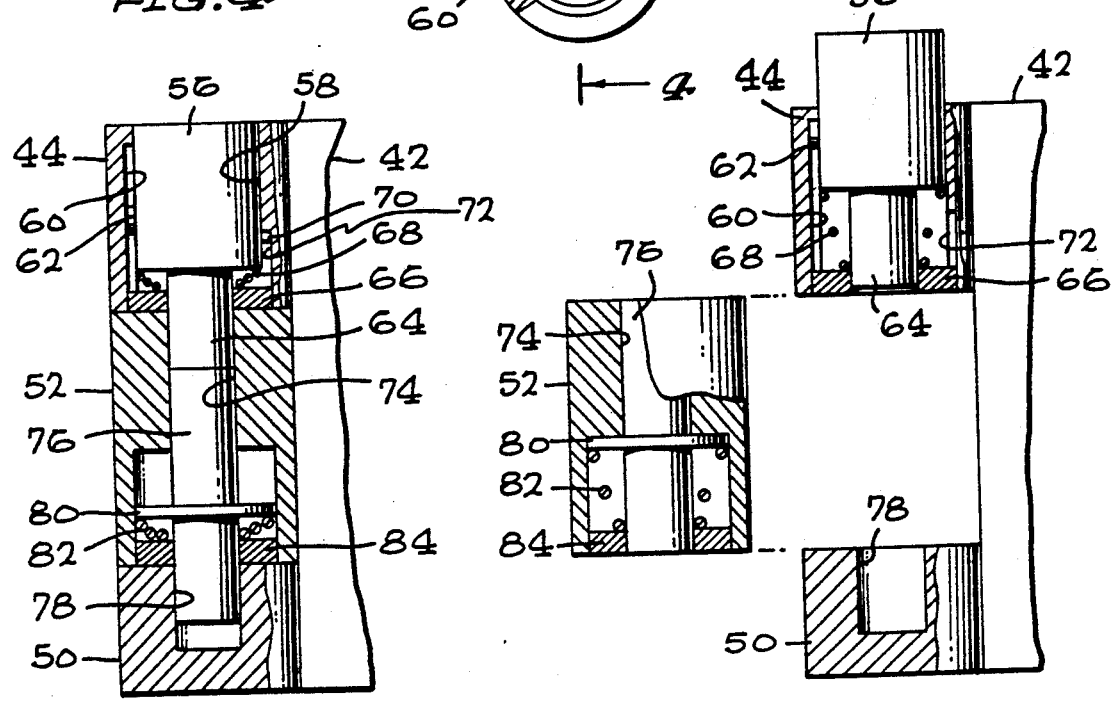
FIG. 5 is a view similar to FIG. 4, but showing the lock pins disengaged and the protector portions separated.

In the extended position shown in FIG. 4, plunger 64 extends downward into bore 74 in pin boss 52. Plunger 76 is slidably positioned within bore 74. The length of the plunger 76 is equal to, or slightly less than, the height of pin boss 52, as seen in FIG. 5. Bore 78 in pin boss 50 is also in alignment, and when the plunger 64 presses down plunger 76, the plunger 76 extends into bore 78. This provides locking at the two junctures between the three lock pin bosses. Plunger 76 is resiliently returned to its upper position by means of resilient structure in pin boss 52. Washer 80 is secured to plunger 76. The washer is in a recess which defines the upper limit of the plunger. Compression spring 82 within the recess engages under washer 80 and resiliently urges the plunger upward. The recess is closed by bottom cover 84. This arrangement of locks, bosses and pins permits secure attachment of the protector portions around the critical part of the steering column.

Figure 6:
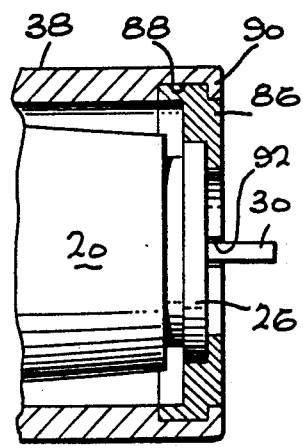
FIG. 6 is a section taken generally along line 6—6 of FIG. 3.
Figure 2:
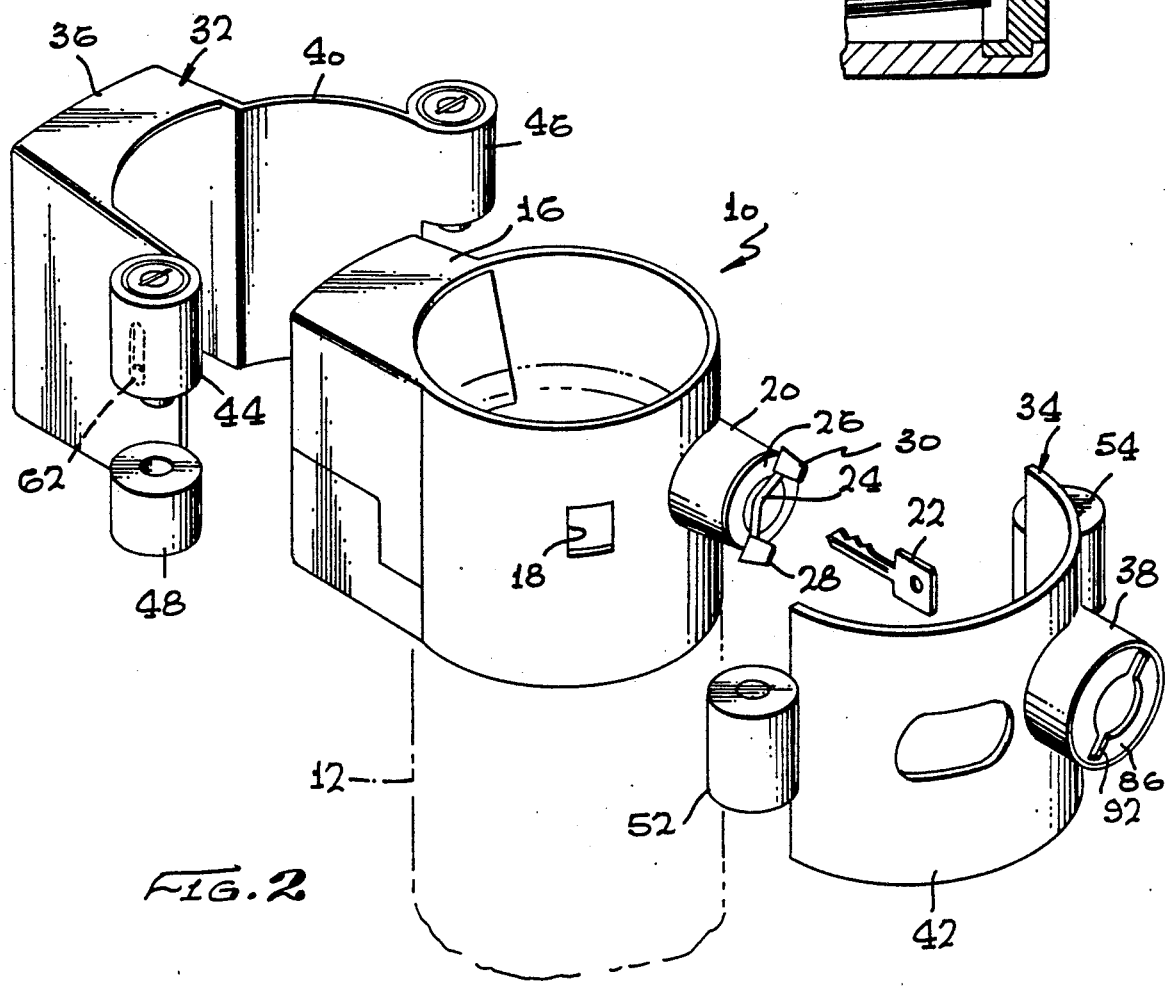
FIG. 2 is an exploded isometric view of the steering wheel lock protector shown spread from the steering column of the automobile.

Protector plate 86, as best seen in FIGS. 2 and 6, is rotatably mounted within tubular housing 38 at the face thereof. Annular groove 88 receives the edge of the circular protector plate so that flange 90 lies in front of the outer edge of the protector plate to inhibit withdrawal of the protector plate. The protector plate is made of hard metal to resist cutting. As is best seen in FIG. 2, protector plate 86 has a slot 92 therein which is sufficiently sized to receive the ears 28 and 30 and expose the key slot 24. However, the openings in the protector plate are sized so that the protector plate still overlies the front of the barrel 26, as seen in FIG. 6. In this way, there is complete access to insert the key 22 and turn the ignition on and off by engagement with the ears 28 and 30, but the barrel is protected from withdrawal by the protector plate 86. Once lock protector 10 is installed, it need not be removed, but remains in place while the car is unused and locked and remains in place during use of the automobile.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A lock comprising:
   first and second portions to be releasably locked with respect to each other;
   first and second aligned bosses on said first portion, said bosses having an aligned axis, a lock in said first boss and having locked and unlocked positions, said lock having a first plunger therein, said plunger being positioned within said first boss when said lock is in the unlocked position and said plunger extending on said axis toward said second boss when said lock is in the locked position;
   a third boss, said third boss being secured to said second portion, said third boss having an axis, said third boss being positionable between said first and second bosses with their axes aligned;
   a second plunger in said third boss, said plunger being spring-urged toward a position wherein said second plunger is totally within said third boss, a plunger recess in said second boss, said plunger recess being sized to receive a portion of said second plunger in said third boss so that, when said bosses are aligned and said lock plunger is extended, said lock plunger engages said second plunger in said third boss and thrusts a portion of said second plunger in said third boss into said recess in said second boss so that said plungers extend across both the interfaces between said first and second bosses on said first portion and said third boss on said second portion.

2. The lock of claim 1 wherein said plunger in said third boss has a spring stop secured thereto and a spring engaged against said spring stop so that said spring resiliently urges said plunger to a position where it lies within said boss on said second portion.

3. The lock of claim 2 wherein said spring is a compression spring and it lies within a spring pocket around said plunger in said third boss and there is a cover on said spring pocket.

4. The lock of claim 3 wherein said compression spring thrusts said plunger in said third boss toward said first boss.

5. The lock of claim 1 wherein said lock in said first boss is slidable along said axis and said plunger is fixed to said lock and there is locking interengagement between said lock and said first boss to hold said lock in a depressed position wherein its plunger is extended from said first boss toward said second boss.

6. The lock of claim 5 wherein there is a spring pocket below said lock and a compression spring within said spring pocket, said compression spring urging said lock to its extended position and said plunger to its retracted position.

7. The lock of claim 6 wherein said plunger in said third boss has a spring stop secured thereto and a spring engaged against said spring stop so that said spring resiliently urges said plunger to a position where it lies within said boss on said second portion.

8. The lock of claim 7 wherein said spring is a compression spring and it lies within a spring pocket around said plunger in said third boss and there is a cover on said spring pocket.

9. The lock of claim 8 wherein said compression spring thrusts said plunger in said third boss toward said first boss.

10. For use with an automotive vehicle comprising a steering wheel column having an ignition lock boss, an ignition lock within the ignition lock boss, and a key for operating the ignition lock, a steering wheel lock protector comprising:
    first and second protector portions sized and configured to embrace said steering wheel column and ignition lock boss;
    means for releasably locking said first and second protector portions together, said means comprising first and second protector lock bosses in spaced alignment on one of said protector portions, a third protector lock boss on the other of said protector portions and positioned in alignment between said first and second lock bosses when said lock protector is in a closed, steering wheel column-embracing position, a first plunger positioned in said first lock boss, and a second plunger positioned in said third lock boss so that, when said first plunger is thrust into locking position partway into said third lock boss, said second plunger is thrust into second lock boss to provide a plunger across both the interfaces between said bosses on said first and second protector portions;
    a tubular housing on said second protector portions, said tubular housing being sized to receive said ignition lock boss; and
    a protector plate rotatably mounted in said tubular housing, said protector plate having a slot therein to receive said key into said ignition lock for manipulation of said ignition lock without removal of said lock protector.

11. The steering wheel lock protector of claim 10 wherein there are two sets of lock bosses on each of said protector portions so that said first and second protector portions are releasably locked on both sides thereof.

12. For use with an automotive vehicle
    comprising a steering wheel column having an ignition lock boss, an ignition lock within the ignition lock boss, and a key for operating the ignition lock,
    a steering wheel lock protector comprising:
    first and second protector portions, said first and second protector portions being positionable adjacent each other wherein they embrace said steering wheel column at said ignition lock, one of said protector portions having a tubular housing for receiving said ignition lock boss;
    a protector plate rotatably mounted in said tubular housing, said protector plate having a slot therein sized to receive said ignition key so that, when said protector plate is in place, said ignition lock can have said key inserted therein and can be actuated by manual engagement of the key;
    first and second bosses on said first protector portion, said first and second bosses having aligned bores therein, said first boss having a lock therein, said lock having a first plunger thereon and configured so that said first plunger extends between said first and second bosses when said lock is in the locked position;
    a third boss on said second protector portion, said third boss having a bore therein and being sized to fit between said first and second bosses on said first protector portion so that, when in aligned position, said first plunger on said lock engages in said bore in said third boss on said second protector portion; and
    a second plunger in said bore in said third boss, said second plunger being thrust into said second boss when said first plunger in said first boss extends into said third boss so that both of the interfaces between said bosses on said first and second protector portions have plungers extending thereacross.

13. The steering wheel lock protector of claim 12 wherein said second plunger in said third boss on said second protector portion is spring-loaded toward a position wherein said second plunger does not extend from said boss on said second protector portion.

14. The steering wheel lock protector of claim 12 wherein there are two pairs of first and second bosses on said first protector portion, said two pairs being spaced from each other to be positioned substantially on opposite sides of the steering column when the lock protector is in place; and
    there are two spaced bosses on said second portion of said lock protector sized and positioned to be positioned between said pairs of first and second bosses on said first protector portion so that said lock protector can be locked and unlocked at two locations between said first and second protector portions to aid in positioning and engaging said first and second protector portions around an automobile steering column.

15. The steering wheel lock protector of claim 14 wherein said plunger in said third boss on said second protector portion is spring-loaded toward a position wherein said plunger does not extend from said boss on said second protector portion.

* * * * *